(No Model.)
H. B. YARYAN.
CORN POPPER.
No. 450,279. Patented Apr. 14, 1891.
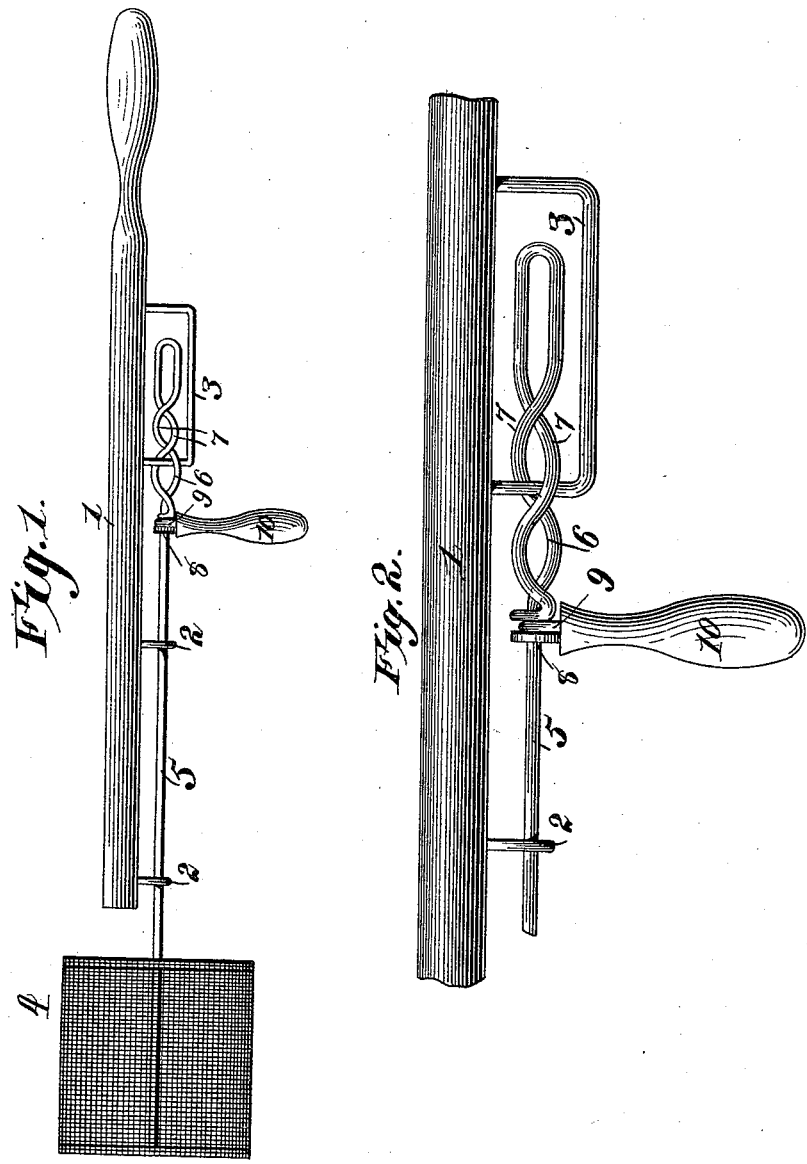
Witnesses
H. G. Dieterich.
R. J. Marshall
Inventor
Harvey B. Yaryan.
By his Attorneys,
C. A. Snow & Co.

UNITED STATES PATENT OFFICE.

HARVEY B. YARYAN, OF CRAWFORDSVILLE, INDIANA, ASSIGNOR OF TWO-THIRDS TO JAMES R. BRYANT AND JACOB JOLE, OF SAME PLACE.

CORN-POPPER.

SPECIFICATION forming part of Letters Patent No. 450,279, dated April 14, 1891.

Application filed August 23, 1890. Serial No. 362,898. (No model.)

*To all whom it may concern:*

Be it known that I, HARVEY B. YARYAN, a citizen of the United States, residing at Crawfordsville, in the county of Montgomery and State of Indiana, have invented a new and useful Corn-Popper, of which the following is a specification.

This invention has relation to corn-poppers; and the objects in view are to provide an extremely cheap and simple device for popping corn, which device is adapted for oscillation during the popping of the corn, whereby the same is prevented from becoming scorched.

With the above objects in view the invention consists in certain detailed features of construction hereinafter specified, and particularly pointed out in the claims.

Referring to the drawings, Figure 1 is a side elevation of a corn-popper constructed in accordance with my invention. Fig. 2 is a similar view, in detail and enlarged, of the spiral portion of the popping-cylinder rod and of the adjacent portion of the handle.

Like numerals of reference indicate like parts in all the figures.

1 designates a suitable handle by which the utensil may be held and supported over the fire, and said handle is provided with in this instance a pair of aligning eyes 2, and below the same or near the inner end of the handle with a bail 3.

4 designates the popping-cylinder, which is of the usual construction, and through the axis of the same passes the rod 5. The rod 5 is of wire and is mounted in the eyes 2. Thereby it is adapted for reciprocation, and is then passed around the upper end of the bail 3 to form a loop, after which the terminal of the wire is coiled about said rod at the opposite side of the bail. The loop thus formed is loosely twisted, so that opposite spirals 6 are formed at each side of the bend 7, said spirals being loose, or, in other words, spaced apart, and forming a spiral path which receives the upper end of the bail 3.

Above the point of connection between the terminal and the wire rod, is formed a shoulder 8, and between the shoulder and the coiled end of the terminal is mounted loosely an eye 9, secured to the front or inner end of a handle 10.

In operation the corn is placed in the cylinder and the latter supported over the fire. By grasping the handle 1 with the left hand the popper may be maintained at a suitable elevation above the fire, and by grasping the handle 10 with the right hand and reciprocating the same back and forth between the inner one of the eyes 2 and the outer end of the bail 3 said rod 5 will be given an oscillating reciprocating movement, as will also the popping-cylinder, so that all portions of the individual grains will be presented for a moment to the action of the heat, and thus a uniform popping secured. The oscillating movement, it will be obvious, is secured by reason of the spiral path existing between the opposite spirals of the wire rod, said rod being forced back and forth, and therefore causing the upper end of the bail to pass between the spirals.

It is obvious that the bail may be omitted and simply a pin employed for causing this movement, if so desired.

Having thus described my invention, what I claim is—

1. In a corn-popper, the combination, with the handle 1, having aligning guides and a projection below the same, of a rod mounted for reciprocation in the guides and having its inner end bent to form opposite spirals forming an intermediate spiral path into which the projection extends, a handle loosely mounted on the rod, and a popping-cylinder at the outer end of the rod, substantially as specified.

2. In a corn-popper, the combination, with the handle 1, the eyes 2, and the bail 3 in rear of the same and aligning with the eyes, of the popper 4, the rod 5, formed of wire and mounted for reciprocation in the eyes, said rod being passed around the upper end of the bail and connected to itself and spirally twisted and above said connection provided with a shoulder, an eye mounted loosely between the shoulder and the connection, and a handle secured to the outer end of the eye, substantially as specified.

In testimony that I claim the foregoing as my own I have hereto affixed my signature in presence of two witnesses.

HARVEY B. YARYAN.

Witnesses:
JAMES R. BRYANT,
JENNIE J. BRYANT.